United States Patent Office 2,888,738
Patented June 2, 1959

2,888,738

SINTERED METAL BODIES CONTAINING BORON NITRIDE

Kenneth M. Taylor, Lewiston, N.Y., assignor to The Carborundum Company, Niagara Falls, N.Y., a corporation of Delaware No Drawing. Application December 24, 1954
Serial No. 477,587

9 Claims. (Cl. 29—182.5)

This invention relates to bodies or articles of manufacture comprising a non-reactive metal or alloy, such as aluminum or bronze, and boron nitride, and to compositions and methods for making the same. This application is a continuation-in-part of my copending application Serial No. 435,087, filed June 7, 1954, now abandoned.

There is a constant search for new compositions or bodies which will possess unexpected combinations of properties essential to or generally found to be desirable in specific fields of use. The bodies of the present invention possess certain combinations of properties and characteristics which render them of considerable value, and they offer outstanding possibilities in a number of fields of use. It is therefore to be understood that the metal-boron nitride bodies hereinafter more fully described are not to be considered as restricted to any particular field of use. However, their outstanding characteristics as friction bearings are particularly worthy of note and make them especially suitable for a number of bearing purposes. The present invention therefore will be described primarily in respect to the use of the hereindescribed products for bearing purposes, although not intended to be limited thereto.

Above all, a bearing body must possess a low coefficient of friction. Other desirable characteristics sought in bearing bodies or shapes for certain particular uses include friability, that is an ability to break down or crumble under excessive strain, and reasonably good resistance to oxidation where oxidizing conditions are encountered in use.

In order to obtain a high degree of perfection in respect to one or more of the above properties peculiarly desirable for the specific bearing or other purpose in mind, usually it has been found necessary to forego the benefits of maximum performance in respect to certain other desirable properties. Consequently various bearing compositions exceptionally suitable for one field of use are often found to be entirely unsatisfactory for other purposes. There is, therefore, a continual demand for bearing bodies of new composition which will meet those demands of a special nature that require novel combinations of properties not to be found in those compositions of a bearing nature already available.

It is therefore an object of the present invention to provide metallic bearing bodies or shapes of unusual and distinctive composition and properties.

It is another object of the present invention to provide bearing bodies or shapes having a particular combination of properties heretofore unavailable in bearing compositions.

It is another object to provide novel compositions of matter comprising one or more metals and boron nitride.

It is a further object to provide practical methods and compositions for making such articles.

Shapes or bodies made in accordance with the present invention comprise a predominant or major amount of non-reactive metal and a lesser or minor amount of boron nitride. The boron nitride in the body should not amount to more than about 30% by weight of the article since greater amounts of boron nitride result in soft articles lacking the necessary strength required for most practical applications. As the amount of boron nitride is further decreased the strength of the article becomes greater so that, while there are some purposes for which bodies containing as much as 30% by weight of boron nitride can be desirably used and are considered of value because of their unique properties and are within the broad scope of the present invention, for most bearing purposes it is preferred to keep the content of boron nitride around 15% or less by weight. For example, articles of very satisfactory strength and bearing properties consisting essentially of 10% by weight of boron nitride and 90% of a high copper alloy, such as bronze, have been made.

The term "non-reactive metal" as used in the specification and claims of this application to describe the metal component of the bodies of the present invention means any metal or combination of metals that does not react appreciably with or decompose boron nitride under the conditions of manufacture of the bodies of the present invention. Specifically, this term is intended to exclude substantial amounts of the transition metals of the fourth, fifth and sixth groups of Mendelyeev's Periodic Table, namely titanium, zirconium, halfnium, vanadium, columbium, tantalum, chromium, molybdenum, and tungsten. Recent experiments have indicated that at elevated temperatures the transition metals of the fourth, fifth and sixth group of the period table decompose boron nitride, forming metal borides and/or metal nitrides. This reaction appears to begin at temperatures in the neighborhood of 1500° C., and at temperatures of from about 2000° C. to 2500° C., depending on the particular metal present, proceeds substantially to completion. It is to be noted that these temperatures are in most instances substantially below the melting temperature of the particular metal involved. Therefore, to sinter or hot-press a raw mix consisting of a minor amount of boron nitride and a major amount of a transition metal of the fourth, fifth or sixth group of the periodic table, temperatures above the reaction temperature of the metal with boron nitride are required. Consequently the resultant body contains no substantial amount of boron nitride, but rather contains metal plus metal boride and/or metal nitride. Such bodies are not within the scope of the present invention, and likewise the use of substantial amounts of the transition metals of the fourth, fifth and sixth group are not within the scope of the present invention. However, in addition to a major amount of a non-reactive metal, minor amounts of the transition metals of the fourth, fifth and sixth group may be included in the raw mixes, either as the powder of the metal per se or as an ingredient in a non-reactive metal alloy. For example, highly satisfactory bodies have been made employing as the metallic ingredient of the raw mix stainless steel containing about 8% of chromium. Such raw mixes can be hot-pressed or sintered at temperatures substantially below the temperature at which chromium decomposes boron nitride. These bodies and their manufactures are within the scope of the present invention.

The bodies or articles of the present invention are made by either hot pressing or by cold pressing and sintering raw mixes comprising a major amount of non-reactive metal powder and a minor amount of boron nitride powder. The hot pressing or the sintering of these bodies is carried out at a temperature slightly below the melting temperature of the metal constituent of the raw mix, as is customary in the art of sintering. For example, aluminum-containing bodies may be fired at about 570° C., bronze-containing articles at a temperature of about 730° C., cobalt-containing articles at a temperature of about 1000° C., and stainless steel or nickel-containing bodies at temperatures of about 1100–1200° C.

In hot pressing it is preferred to use a pressure of about 2,000 pounds per square inch maintained throughout the pressing. However, pressures substantially more than this are completely satisfactory, and likewise pressures substantially lower than this pressure are satisfactory. Pressures as low as about 500 pounds per square inch have given completely successful bodies. In general it can be said that the higher the pressure used during hot pressing, the lower should be the hot pressing temperature. That is, the hot pressing temperature should not be so high as to permit substantial extrusion of the plastic mix around the mold plunger.

For cold pressing, a pressure of about 20,000 pounds per square inch is preferred. However, pressures ranging from about 10,000 pounds per square inch to about 40,000 pounds per square inch or more have been used with complete success. Furthermore, pressures outside of this range can be used with complete satisfaction, denser and usually stronger bodies being obtained at the higher cold pressing pressures.

The boron nitride used in carrying out the present invention may be a commercial grade of boron nitride material available on the market. However, I prefer to use a boron nitride material made in accordance with the process described in my copending application Serial No. 288,553, filed May 17, 1952, now Patent No. 2,808,314, which boron nitride material has been heat treated as hereinafter described. The method disclosed in my aforesaid application can be described briefly as comprising forming a porous pelleted mixture of boric acid or boric oxide and a diluent such as tricalcium phosphate and nitriding the pelleted mixture by heating it in a suitable furnace at a temperature of around 900° C. in an atmosphere of ammonia for several hours whereby the boric oxide or acid is converted to boron nitride. After the nitriding step the resulting nitrided pellets are crushed and treated with dilute hydrochloric acid to dissolve the tricalcium phosphate and certain other extraneous material. The undissolved boron nitride after several washings with water usually is treated with hot 95% alcohol to further lower the content of oxidic material and is dried by allowing it to stand overnight at room temperature, followed by heating for two hours at 300° F. A typical analysis of the resulting boron nitride is as follows.

|   | Percent |
|---|---|
| Boron | 41.45 |
| Nitrogen | 44.00 |
| Free boric acid (calculated as $H_3BO_3$) | .75 |
| Silica | .28 |
| Calcium | Trace |
| Phosphate ($PO_4$) | Trace |
| Metallic volatile at 110° C. | .26 |

I have also discovered that boron nitride that is unusually stable against water can be produced by heating in an atmosphere of ammonia at temperatures of 1400° C. and above for several hours boron nitride material made in accordance with the aforesaid patent application. This preheated boron nitride, after heat treatment as described below, may also be used in carrying out the present invention.

The above-referred to heat treatment which is given to the above-described boron nitride materials prior to their inclusion in the raw mixes of the present invention comprises heating the material in a non-oxidizing atmosphere for an hour or longer at about 2000° C. or higher. This treatment apparently causes crystalline growth producing a slippery graphite-like material with exceptional lubricating properties. The heat treatment can be carried on in a high frequency induction furnace with a graphite susceptor, in which case no provision for non-oxidizing atmosphere need be made, the furnace atmosphere being non-oxidizing. The resultant heat treated mass of boron nitride is crushed or milled to small particle size before inclusion in the raw mixes.

In order that the invention may be more clearly understood, the following examples are submitted as illustrative of compositions for and the methods of carrying out the present invention:

EXAMPLE I

A raw mixture consisting of 5% of a commercial boron nitride powder and 95% of a 90% copper-10% tin bronze was made by intimately commingling boron nitride powder, made in accordance with my aforesaid patent application and heat treated for one hour at about 2000° C., with powdered bronze that had been screened through a 100 mesh U.S. Standard screen. A bar approximately 1½" x ½" x ¼" was then cold pressed from the above-mentioned raw mix at about 60,000 pounds per square inch. The cold pressed bar was sound appearing and had moderate green strength. This bar was then fired in a reducing atmosphere at a temperature of about 730° C. for about two hours. The resulting sintered body, consisting essentially of bronze and boron nitride, had an apparent density of 6.05 grams per cubic centimeter and a modulus of rupture of about 5,000 pounds per square inch.

EXAMPLE II

Several 95% bronze-5% boron nitride bars 1½" x ½" x ¼" were made in accordance with the procedure set forth in Example I, except that the bars were cold pressed at 40,000 pounds per square inch. These bars had an average modulus of rupture of 4,000 pounds per square inch. This is to be contrasted with a modulus of rupture of 77,000 pounds per square inch for a control bar made by identical technique but using a raw mix consisting of only bronze powder. Incorporation of 5% boron nitride in the bronze body therefore caused approximately a 95% decrease in the modulus of rupture of the sintered body. The electrical resistivity of these bronze-boron nitride bodies was about $38.8 \times 10^{-6}$ ohms per cubic centimeter, or only about twice the resistivity of bronze per se. The sandblast penetration, which is computed by subjecting a fixed area of the body to a sandblast of fixed duration and measuring the depth of the resulting hole, was 0.004", as compared to about 0.001" for bronze per se and 0.046" to 0.049" for plate glass.

EXAMPLE III

A bar 1½" x ½" x ¼" was made from a raw mix consisting essentially of 95% cobalt and 5% boron nitride by cold pressing at 40,000 pounds per square inch and thereafter sintering at a temperature of about 1000° C. The resulting cold pressed and sintered body, consisting essentially of cobalt and boron nitride, had a modulus of rupture of 15,800 pounds per square inch. In contrast, an identically shaped test bar made in accordance with the same procedure but molded from a raw mix containing only cobalt had a modulus of rupture of 58,500 pounds per square inch. The electrical resistivity of this body was about $34.86 \times 10^{-6}$ ohms per cubic centimeter, as compared with a specific resistivity of about $9.8 \times 10^{-6}$ ohms per cubic centimeter for cobalt per se. The sandblast penetration was 0.005", as compared to about 0.001" for cobalt per se.

EXAMPLE IV

Bars 1½" x ½" x ¼" were made from raw mixes consisting of aluminum powder 300 mesh size and finer in particle size and boron nitride made in accordance with the above-described process and heat treated in an atmosphere of ammonia for one hour at about 2100° C. A control bar was also made from a raw mix of only aluminum. The raw mixes were made by screening the aluminum powder and boron nitride powder together several times through a 100 mesh screen. The bars were formed by cold pressing followed by sintering in a cracked hydrocarbon carbonaceous atmosphere at about 570° C. The following table lists the forming pressure and the average modulus of rupture of the various bars:

Table I

| Bar No. | Boron Nitride, percent | Forming Pressure, p.s.i. | Modulus of Rupture, p.s.i. |
|---|---|---|---|
| 1 | 0 | 40,000 | 27,800 |
| 2 | 1 | 40,000 | 22,000 |
| 3 | 1 | 20,000 | 18,500 |
| 4 | 3 | 40,000 | 12,300 |

All of these bars had a slightly brown surface layer about 1/32" thick. It is suspected that this was caused by the carbonaceous firing atmosphere.

EXAMPLE V

A bar 1½" x ½" x ¼" was made by cold pressing at 40,000 pounds per square inch a raw mix of aluminum and boron nitride prepared as described in Example IV. A control bar pressed from a raw mix of only aluminum was also made. These bars were sintered at a temperature of about 570° C. for one and one-half hours in a helium atmosphere. The following table shows the modulus of rupture of these bodies:

Table II

| Bar No. | Boron Nitride, percent | Modulus of Rupture, p.s.i. |
|---|---|---|
| 1 | 0 | 29,000 |
| 2 | 3 | 16,000 |

There was no apparent surface layer on the bar containing boron nitride. Sintering in a non-carbonaceous atmosphere, such as a helium atmosphere, apparently produces stronger bodies without the surface layer. The specific electrical resistivity of bar No. 2 was about $4.7 \times 10^{-6}$ ohms per cubic centimeter, as compared with a specific resistivity of about $2.8 \times 10^{-6}$ for aluminum per se. The sandblast penetration of bar No. 2 was 0.004", as compared to about 0.001" for aluminum per se.

EXAMPLE VI

Bars consisting of 95% nickel and 5% boron nitride were made by hot pressing a raw mix consisting of 95% nickel powder and 5% boron nitride of the type described in Example IV. These bars were hot pressed at a pressure of 2,000 p.s.i. and a temperature of about 1100° C. The resultant bodies, consisting essentially of nickel and boron nitride, had an electrical resistivity of about $333 \times 10^{-6}$ ohms per cubic centimeter as compared to a resistivity of about $7.8 \times 10^{-6}$ ohms per cubic centimeter for nickel containing no boron nitride. While the resistivity of this nickel-boron nitride body is much greater than the resistivity of nickel per se, such a body is still classified as a very good conductor of electricity.

EXAMPLE VII

A raw mix consisting of 90% cobalt and 10% boron nitride was made by sifting together cobalt powder 200 mesh and finer in particle size and boron nitride powder of the type described in Example IV through a 100 mesh screen three times. This raw mix was then placed in a graphite mold with a moveable graphite plunger and hot pressed in a high frequency electric induction furnace to a maximum temperature of 1300° C. A constant pressure of 2,000 pounds per square inch was maintained during the hot pressing. Upon removing the resultant hot pressed body from the mold it was noticed that substantial extrusion around the mold plunger had occurred during hot pressing. It was concluded that the temperature of 1300° C. was too high for optimum hot pressing of this particular raw mix. However, the resultant body was extremely sound and had a density of 5.15 grams per cubic centimeter.

EXAMPLE VIII

A boron nitride body consisting essentially of 95% nickel and 5% boron nitride was made from a raw mix prepared in accordance with the procedure outlined in Example VII from nickel powder and boron nitride of the type described in Example IV. The raw mix was hot pressed in a mold placed in a high frequency electric induction furnace at a maximum temperature of 1150° C. A constant pressure of 2,000 pounds per square inch was maintained during hot pressing. No substantial extrusion occurred during hot pressing. The resulting hot pressed body had a density of 7.33 grams per cubic centimeter and a sandblast penetration hardness of 0.050" as compared to about 0.001" for nickel per se.

EXAMPLE IX

A bar consisting essentially of 95% stainless steel (18% nickel-8% chrome stainless steel) and 5% boron nitride was made by milling for 24 hours in alcohol a raw mix consisting of 95% stainless steel powder and 5% boron nitride powder of the type described in Example IV. This raw mix was then hot pressed in a mold placed in a high frequency electric induction furnace at a maximum temperature of 1175° C. A constant pressure of 2,000 pounds per square inch was maintained during hot pressing. No substantial extrusion occurred during hot pressing. The resulting body had a density of 6.37 grams per cubic centimeter, and an electrical resistivity of $479 \times 10^{-6}$ ohms per cubic centimeter as compared to a resistivity of about $72 \times 10^{-6}$ ohms per cubic centimeter for stainless steel per se. This stainless steel-boron nitride body is classified as a good conductor of electricity. The sandblast penetration was 0.004" as compared to about 0.001" for stainless steel per se.

EXAMPLE X

A body consisting of 95% nickel and 5% boron nitride was made preparing in accordance with the procedure outlined in the above example a raw mix consisting of 95% nickel powder and 5% boron nitride of the type described in Example IV. The raw mix was then hot pressed in a mold placed in a high frequency electric induction furnace at a maximum temperature of 1275° C. A constant pressure of 2,000 pounds per square inch was maintained during the hot pressing. No substantial extrusion occurred during hot pressing. The resulting hot pressed body had a density of 7.38 grams per cubic centimeter. The sandblast penetration on this body was substantially less than on the body of Example VIII, being only 0.018". Apparently the higher pressing temperature gave a tougher, less friable body.

As is shown in those of the above examples where the modulus of rupture of metal-boron nitride bodies was compared with the modulus of rupture of control bars, small amounts of boron nitride added to the metal cause a substantial decrease in the strength of the metal. These boron nitride-containing metal bodies are relatively friable, crumbling under excessive strains rather than extruding or drawing substantially, as is indicated by their increased sandblast penetrations as compared with the metals per se. These bodies have extremely low ductility and also have extremely low coefficients of friction. This combination of properties, namely, friability in conjuction with a low coefficient of friction, makes these bodies ideal for many bearings, shroud rings and the like. Also, inasmuch as boron nitride has relatively good resistance to oxidation, as compared to graphite, the bodies of the present invention are particularly useful where oxidizing conditions are encountered. Where a high melting metal is used, the metal-boron nitride bodies are excellent high temperature bearing and rubbing seal bodies.

As is shown in certain of the above examples, the specific electrical resistivity of the bodies of the present invention is greater than that of bodies of the corresponding metal per se. However, the metal bodies containing minor amounts of boron nitride are still good conductors of electricity. Apparently these bodies of the present invention consist essentially of boron nitride in a continuous phase interstitial matrix of metal. Of course, the greater the amount of boron nitride in the body the higher will be the electrical resistance since boron nitride is itself classified as a non-conductor of electricity. However, even with high percentages of boron nitride present the bodies of the present invention are relatively good conductors of electricity where the metal is in a continuous phase.

Because of the high electrical conductivity (low resistivity) of the bodies of the present invention they may be used for many electrical purposes. For example, they are excellently adapted for use as electrical contact brushes and commutator rings because of their good conductivity and low coefficient of friction. Also, certain of the bodies of the present invention are suitable for use as electrical switch contacts.

Although the raw mixes for the manufacture of the bodies of the present invention as set forth in the examples above contain only boron nitride powder and a nonreactive metal powder, it may be desirable in some cases to include small amounts of other materials such as a pore former or a temporary binder. Inclusion of a pore former, such as a vaporizable material, will yield a cold pressed and sintered body of increased porosity and lower bulk density. Such bodies may be used as catalyst carriers and the like. Temporary binders may be desirable in the practice of the method of the present invention particularly where the metal used has low ductility and so does not consolidate readily upon pressing. For example, it may be desirable to include a temporary binder in raw mixes containing silicon.

Furthermore, it may be desirable to include in the raw mixes, besides non-reactive metal and boron nitride, minor amounts of extraneous ingredients such as inert refractory oxides or the like. Substantial amounts of such materials can be tolerated provided that the boron nitride content is not more than 30% by weight.

While the preferred practice of the present invention includes heat treating at about 2000° C. for an hour or more the boron nitride powder prior to including it in the raw mixes so as to have the boron nitride in a superior lubricating condition, the step of heat treating is not in all cases necessary and in fact in some cases is undesirable, depending on the use to which the boron nitride-metal body is to be put. Specifically, certain available commercial grades of boron nitride have excellent lubricating properties and so do not require heat treatment. Also, the boron nitride made in accordance with my patent application Serial No. 288,553 may be used without heat treatment.

While the preparation of the bodies of the present invention has been described in the above examples as making the various molded shapes from a mixture of boron nitride and non-reactive metal and molding the mixture to the exact shape or form in which it is intended for use, the present invention is not intended to be so restricted. Another way of making and using metal-boron nitride bodies is to mold the raw batch of materials into briquettes or shapes or otherwise compress a mass of material having a composition of the desired proportions, after which the resulting briquette or compressed bodies are heated in the manner already described. After removal from the furnace they are crushed to granular form of the required grit size. The resulting granular metal-boron nitride material can then be used in loose granular form for certain electrical and other applications. It also may be used as a loose filtering media or as a catalyst carrier material. The granular material can also be bonded by means of a second heat treatment, such as hot pressing or cold pressing and sintering, or it can be bonded by means of an auxiliary metal in accordance with known powder metallurgy technique. Furthermore, if desired, the granular boron nitride-metal material can be bonded by various vitreous or ceramic bonds, or other bonding materials to form articles suitable for many industrial uses, such as various bearing uses.

Having described the invention it is desired to claim:

1. A sintered, powdered metal compact consisting essentially of metal selected from the group consisting of copper, tin, cobalt, nickel, steel, aluminum and mixtures thereof and containing intimately dispersed therethrough about 1 to 30% by weight boron nitride.

2. A sintered, powdered metal compact consisting essentially of a copper-tin alloy containing intimately dispersed therethrough about 1 to 30% by weight boron nitride.

3. A sintered, powdered metal compact consisting essentially of cobalt containing intimately dispersed therethrough about 1 to 30% by weight boron nitride.

4. A sintered, powdered metal compact consisting essentially of nickel containing initimately dispersed therethrough about 1 to 30% by weight boron nitride.

5. A sintered, powdered metal compact consisting essentially of stainless steel containing intimately dispersed therethrough about 1 to 30% by weight boron nitride.

6. A sintered, powdered metal compact consisting essentially of aluminum containing intimately dispersed therethrough about 1 to 30% by weight boron nitride.

7. A raw mix for the manufacture of molded articles of manufacture consisting essentially of an intimate powdered mixture of metal selected from the group consisting of copper, tin, cobalt, nickel, steel, aluminum and mixtures thereof and about 1 to 30% by weight boron nitride.

8. A raw mix for the manufacture of molded articles of manufacture consisting essentially of an intimate powdered mixture of metal selected from the group consisting of copper, tin, cobalt, nickel, steel, aluminum and mixtures thereof and about 1 to 15% by weight boron nitride.

9. A sintered, powdered metal compact consisting essentially of metal selected from the group consisting of copper, tin, cobalt, nickel, steel, aluminum and mixtures thereof and containing intimately dispersed therethrough about 1 to 15% by weight boron nitride.

References Cited in the file of this patent

UNITED STATES PATENTS

| Number | Name | Date |
|---|---|---|
| 1,631,493 | Laise | June 7, 1927 |
| 1,858,300 | Laise | May 17, 1932 |
| 1,944,178 | Homerberg | Jan. 23, 1934 |
| 1,950,549 | Fry | Mar. 13, 1934 |
| 2,116,399 | Marth | May 3, 1938 |
| 2,116,400 | Marth | May 3, 1938 |
| 2,160,423 | Stoody | May 30, 1939 |
| 2,219,095 | Schuttler | Oct. 22, 1940 |
| 2,219,423 | Kurtz | Oct. 29, 1940 |
| 2,553,609 | Schmidt | May 22, 1951 |